United States Patent [19]

Green

[11] Patent Number: 4,512,251

[45] Date of Patent: Apr. 23, 1985

[54] RAPID BREATHING, DEGASSING AND STORAGE DEVICE FOR WINE

[75] Inventor: Kenneth Green, 24 Reserve Ave., Blaxland, New South Wales 2774, Australia

[73] Assignees: Kenneth Green; Graham Edward Thomas, both of Blaxland, Australia

[21] Appl. No.: 537,981

[22] Filed: Sep. 30, 1983

[30] Foreign Application Priority Data

Oct. 1, 1982 [AU] Australia .............................. PF6152
Jan. 24, 1983 [AU] Australia .............................. PF7719

[51] Int. Cl.³ .............................................. A23B 7/00
[52] U.S. Cl. ........................................ 99/472; 99/277
[58] Field of Search .................. 99/454, 467, 468, 469, 99/471, 472, 473–476, 276, 277, 277.1, 277.2, 646 R, 646 C, 516, 534; 426/404, 486, 592; 220/231; 206/524.8; 150/55, 65, 66; 141/319, 364; 366/139

[56] References Cited

U.S. PATENT DOCUMENTS

| | | | |
|---|---|---|---|
| 2,157,839 | 5/1939 | Wertheimer | 99/472 X |
| 2,813,026 | 11/1957 | Marcilly | 99/277 X |
| 3,248,233 | 4/1966 | Brent et al. | 99/472 X |
| 4,021,579 | 5/1977 | Barrett | 99/277.1 X |
| 4,287,819 | 9/1981 | Emerit | 99/472 |

*Primary Examiner*—Timothy F. Simone

*Attorney, Agent, or Firm*—Fitch, Even, Tabin & Flannery

[57] ABSTRACT

Disclosed is a method and apparatus for the fast breathing of still wines, in particular red wines. A vacuum is applied to a container which contains, or into which is being introduced, wine. To this purpose an open wine container may merely be placed within an evacuation chamber which is evacuated for a predetermined amount of time. A quick method is provided by a first container including an openable air tight sealing means from which extends two tubes, each communicating with the interior of the first container. One tube is connected to a vacuum pump while the other tube has its free end inserted into a convenient second container which holds the wine to be degassed. Upon evacuating the first container, the wine is drawn up from the second container through the tube into the first container. As the wine enters the first container it is passed through a jet so as to create a wine mist within the evacuated first container. By exposing the wine to the low air pressure gases dissolved in the wine, which normally slowly escape during conventional breathing, escape very rapidly. This method provides full breathing of even low quality wines within a few minutes, the resulting wine being far more palatable as a result. Further disclosed are means for storing opened wines for a longer period by maintaining a vacuum over the free surface of the wine.

4 Claims, 4 Drawing Figures

RAPID BREATHING, DEGASSING AND STORAGE DEVICE FOR WINE

The present invention relates to method and apparatus for the rapid breathing and degassing of wine, particularly red wines.

Throughout the specification, the term "breathe" will be used to indicate the process whereby wines, spirits and other drinks dispense volatile components which are mixed in with the liquid phase. Opened bottles of wine "breathe" naturally, a process which takes up to one or two hours depending upon the wine. Removal of these volatiles improves the taste and the bouquet of the wine, making it more palatable and acceptable to the drinker. Rapid breathing and degassing of lower quality red wines, in particular, produces much improvement in the bouquet and palate in a matter of minutes. The degassing process removes gases and volatiles to an extent not achievable by natural breathing. It has been noticed after extensive evaluation that morning after hangovers are alleviated.

In the case of bottle and flagon wines, the condition of the wine in the flagon will usually deteriorate quite quickly after being opened. One reason for this is the entry of oxygen into flagon, whereby this oxygen reacts with the wine to produce acids which tend to spoil the taste of the wine. Airborne bacteria also come into contact with the wine which assists in spoiling the wine within a day or so. After a bottle of wine has been opened, and it is desired to store the unused portion of the wine contained in the bottle, the air above the wine in the bottle is evacuated. Removal of the air reduces the amount of oxygen and bacteria in contact with the wine. The wine therefore lasts much longer than wine left exposed to the atmosphere.

It is an object of the present invention to provide a breathing apparatus for wine which will substantially overcome, or ameliorate the abovementioned disadvantages.

In accordance with one aspect of the present invention there is disclosed a wine breathing apparatus for expediting the natural breathing of a wine, said apparatus comprising a vacuum pump means adapted to apply a vacuum to a sealably open container of said wine.

According to another aspect of the present invention, there is disclosed a wine breathing apparatus for expediting the natural breathing of a wine, said apparatus comprising a vacuum pump means adapted to apply a vacuum to a container of said wine, said container being opened and placed within the confines of a sealable enclosure having communicable passage with said pump means.

According to a further aspect of the present invention there is disclosed a wine breathing apparatus for expediting the natural breathing of a wine, said apparatus comprising a vacuum pump means adapted to apply a vacuum to said wine, whereby said wine is withdrawn from a first reservoir by said pump means and is sprayed into a chamber being subjected to said vacuum, said chamber including a series of flow plates adapted to allow a layer of wine to flow thereover and is passed into further reservoirs or back over said flow plates if necessary to achieve the desired degree of removal of volatiles.

Some embodiments of the present invention will now be described, by way of example only, with reference to the drawings in which.

Figure 1:
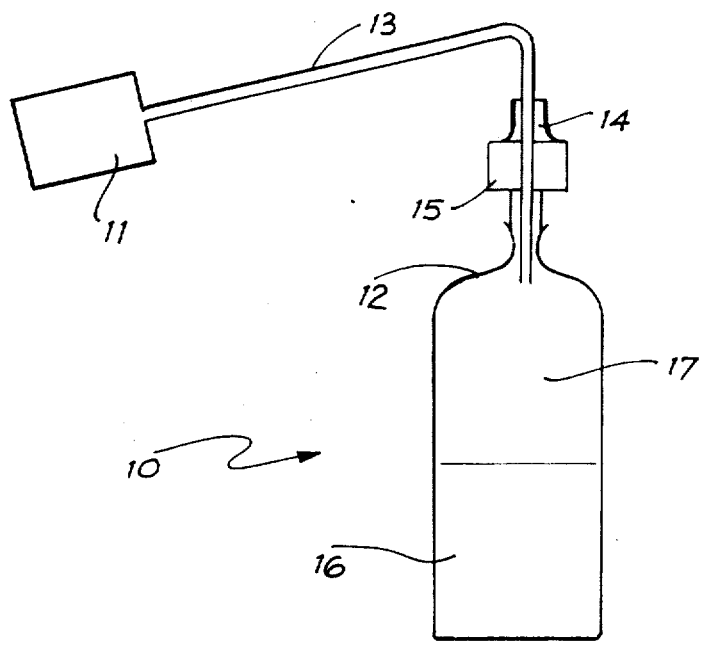
FIG. 1 is a schematic view of a first embodiment of the present invention.

A first embodiment of the present invention is illustrated in FIG. 1 and comprises the breathing apparatus 10 which includes a vacuum pump 11 connected to a bottle 12, via a tube 13, a valve 14 and bung plug 15. The bottle 12 contains wine 16 and an air space 17 thereabove.

The operation of this apparatus 10 is as follows. The vacuum pump 11 applies a vacuum to the air space 17 via the tube 13, thereby reducing the pressure upon the wine 16. Reduction of pressure enables the volatile constituents contained within the liquid phase of the wine 16 to be drawn out of the liquid phase of the wine 16. In order to prevent these gases and air entering back into the bottle 12, there is provided the valve 14, which is a one-way check valve.

For example, a half used bottle of wine can be stored for considerable time in the evacuated state without spoiling the wine. This is due to the lower quantity of oxygen and bacteria in the air space 17.

Figure 2:
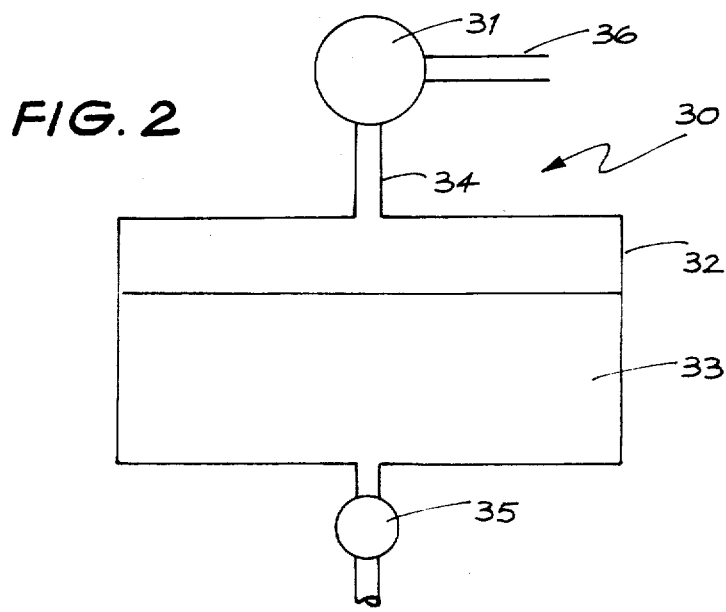
FIG. 2 is a schematic view of a second embodiment of the present invention.

A second embodiment of the present invention is illustrated in FIG. 2 and comprises the breathing apparatus 30 which includes the vacuum pump 31 connected to a reservoir 32, containing wine 33, via connection 34. At the base of said reservoir is a valve 35 to allow removal of the wine 33 from the reservoir 32 for bottling purposes.

The operation of the breathing apparatus 30 is such that the pump 31 applies a vacuum to the tank 32 via the connection 34, thereby lowering the pressure above the surface of the wine 33 and allowing the escape of unwanted volatile gases held in the liquid phase of the wine 33. These gases are extracted from the reservoir 32 and are discharged out to the atmosphere via the conduit 36. Once these gases are extracted, the wine 33 is removed from the reservoir 32 by means of the valve 35 and is taken away for bottling. Such arrangement could well be used on a commercial scale.

Figure 3:
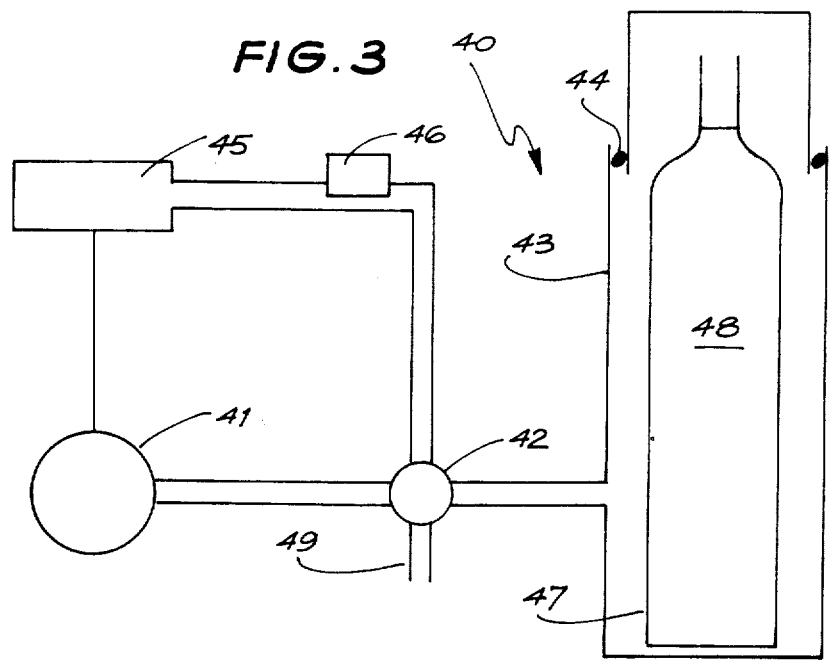
FIG. 3 is a schematic view of a third embodiment of the present invention.

A third embodiment of the present invention is illustrated in FIG. 3 and comprises the breathing apparatus 40 which includes the vacuum pump 41, a two-way valve 42, a sealable enclosure 43 having seals 44, timer 45 and switch 46. Contained within the sealable enclosure 43 is a container 47 containing wine 48.

The operation of this apparatus 40 is as follows. Once the container 47 is placed within the sealable enclosure 43, a vacuum is applied to the interior of the enclosure 43 by the pump 41 via the two-way valve 42. This operation is timed by the timer 45 such that once the desirable period of time has elapsed during which the vacuum has been applied to the enclosure 43, the switch 46 closes the two-way valve 42, thus providing venting to the enclosure 43 via the conduit 49 to atmosphere, and switching off of the vacuum pump 41. In this way, during the operation of the pump 41 there exists above the container 47 an area of lower pressure, thus allowing the gases contained within the wine 48 to escape from the liquid phase of the wine 48. This invention provides a means of breathing wine in a bottle which could find use in a restaurant.

Figure 4:
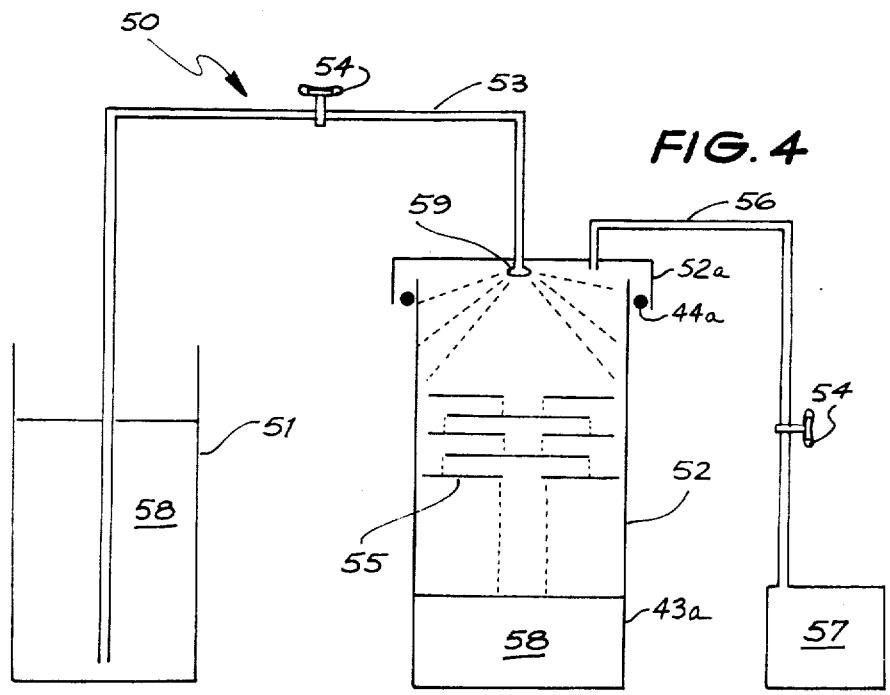
FIG. 4 is a schematic view of a fourth embodiment of the present invention.

A fourth embodiment of the present invention is illustrated in FIG. 4 which comprises the breathing apparatus 50 and includes a wine source 51 connected to the top of a flow chamber 52, via the conduit 53 and valve 54. Spray device 59 dispenses wine entering chamber 52 so as to form a wine spray. The flow chamber 52 contains optional flow plates 55 and access for the conduit 56 which leads to the vacuum pump 57. The base of the flow chamber 52 will contain wine 58 brought there by the process.

The flow chamber 52 is represented in FIG. 4 as consisting of a container 43a, a closure 52a and a seal 44a that engages the closure over the upper open end of the container.

The operation of this embodiment is as follows. A vacuum is applied to the chamber 52 by the vacuum pump 57 via the conduit 56. When the valve 54 is open, the vacuum within the chamber 52 draws wine 58 from the reservoir 51 via the conduit 53 and spray device 59. The wine 58 thus sprays from the top of the chamber 52 onto the flow plates 55 if fitted. This allows a thin film with large surface area of the wine 58 to be exposed to the vacuum which is contained within the flow chamber 52. In so doing, more of the trapped gases within the liquid phase of the wine 58 can be withdrawn from therein in a given time period. The wine 58 thus proceeds from the top of the flow chamber 52 through to the base of the flow chamber 52 where it is then rebottled or served.

Conveniently chamber 52 may be a carafe or other serving device and source 51 a freshly opened bottle. A bottle of red wine, even of low quality, can be made quite palatable after a few minutes. The quick breathing offered by this embodiment makes it very suitable for household and restaurant use.

Where large scale industrial applications are desired any combination of the above described embodiments may be combined in series and/or parallel to form a composite process.

The wines prepared by this rapid breathing method may be stored under vacuum for a time considerably longer than is normal for an opened wine.

The foregoing describes only some embodiments of the present invention, and modifications, obvious to those skilled in the art, can be made thereto without departing from the scope of the present invention.

What I claim is:

1. Apparatus for degassing or breathing of fermented wine contained in a first container, said apparatus comprising:
    a second container having an opening, a container closure, seal means for engaging said container closure over said opening of said second container, a first aperture and a second aperture, each opening to said second container,
    a vacuum source being fluidly connected to an upward location in said second container through said first aperture so as to provide evacuation of gases from said second container therethrough,
    an elongated fluid passage with one end passing through said second aperture and the other end adapted for establishing fluid communication with wine in said first container, whereby upon evacuating said second container, wine from said first container is drawn through said fluid passageway into said second container, and
    a spray device on the end of said fluid passage at an upward location within said second container so that the wine entering therethrough forms a spray or fine mist, whereby the entering wine presents a large surface area from which gas is efficiently extracted under reduced pressure even in the absence of heating which would adversely affect the quality of the wine.

2. Apparatus as in claim 1 further comprising a series of flow plates within said second container proximate and below said spray device and above the anticipated liquid level in said second container, said flow plates adapted to allow a thin layer of wine to flow thereover to promote degassing of the wine.

3. Apparatus as in claim 1 further comprising a valve in said fluid passage.

4. Apparatus as defined in claim 1 further comprising a valve in the fluid connection between said vacuum source and said second container.

* * * * *

UNITED STATES PATENT AND TRADEMARK OFFICE
CERTIFICATE OF CORRECTION

PATENT NO. : 4,512,251

DATED : April 23, 1985

INVENTOR(S) : Kenneth Green

It is certified that error appears in the above-identified patent and that said Letters Patent is hereby corrected as shown below:

Title page, Item (73)

Change the last name of the second Assignee from "Thomas" to --Thoms--.

In the Specification:

Column 2, line 8, after "invention" delete the semicolon and insert a period.

Signed and Sealed this

Fifth Day of July, 1988

Attest:

DONALD J. QUIGG

*Attesting Officer*

*Commissioner of Patents and Trademarks*